United States Patent [19]

Agano et al.

[11] Patent Number: 4,877,958
[45] Date of Patent: Oct. 31, 1989

[54] RADIATION IMAGE READ-OUT METHOD AND APPARATUS

[75] Inventors: Toshitaka Agano; Nobuyoshi Nakajima, both of Kanagawa, Japan

[73] Assignee: Fuji Photo Film Co., Ltd., Kanagawa, Japan

[21] Appl. No.: 138,753

[22] Filed: Dec. 29, 1987

[30] Foreign Application Priority Data

Dec. 29, 1986 [JP] Japan ................. 61-310250

[51] Int. Cl.$^4$ ........................................... G01N 23/04
[52] U.S. Cl. ................................................ 250/327.2
[58] Field of Search ....................... 250/327.2, 484.1

[56] References Cited

U.S. PATENT DOCUMENTS

| | | | |
|---|---|---|---|
| 4,236,078 | 11/1980 | Kotera | 250/327.2 |
| 4,258,264 | 3/1981 | Kotera | 250/327.2 |
| 4,276,473 | 6/1981 | Kato | 250/327.2 |
| 4,302,672 | 11/1981 | Kato | 250/327.2 |
| 4,310,886 | 1/1982 | Kato | 250/327.2 |
| 4,315,318 | 2/1982 | Kato | 250/337 |
| 4,346,295 | 8/1982 | Tanaka | 250/327.2 |
| 4,387,428 | 6/1983 | Ishida | 250/337 |
| 4,527,060 | 7/1985 | Suzuki | 250/327.2 |
| 4,629,891 | 12/1986 | Nakajima et al. | 250/484.1 B |

FOREIGN PATENT DOCUMENTS 56-11395 2/1981 Japan .

Primary Examiner—Carolyn E. Fields
Attorney, Agent, or Firm—Sughrue, Mion, Zinn, Macpeak & Seas

[57] ABSTRACT

In a radiation image read-out method and apparatus, a stimulable phosphor sheet carrying a radiation image stored thereon is exposed to stimulating rays which cause the stimulable phosphor sheet to emit light in proportion to the stored radiation energy, and the emitted light is photoelectrically detected by use of a light detection device to obtain image signals for use in reproduction of a visible image. Light detection ranges of the light detection device suitable for image recording conditions are stored in conformity with the respective image recording conditions in a memory. In the course of detection of the light emitted by the stimulable phosphor sheet, the image recording conditions with respect to the stimulable phosphor sheet on which image read-out is to be carried out are designated, the light detection range corresponding to the designated image recording conditions is read from the memory, and is set in the light detection device. Preliminary read-out is not used.

4 Claims, 2 Drawing Sheets

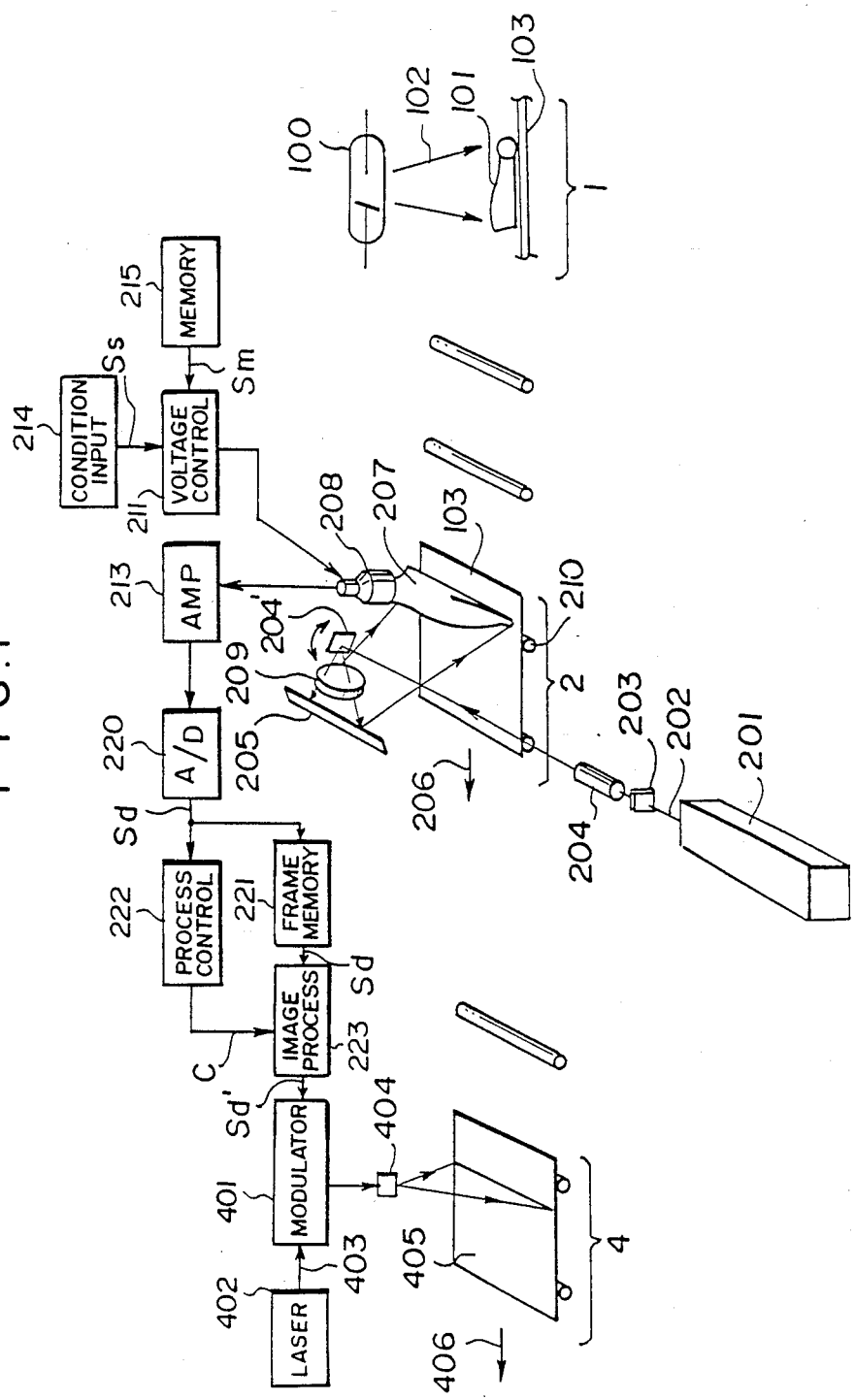

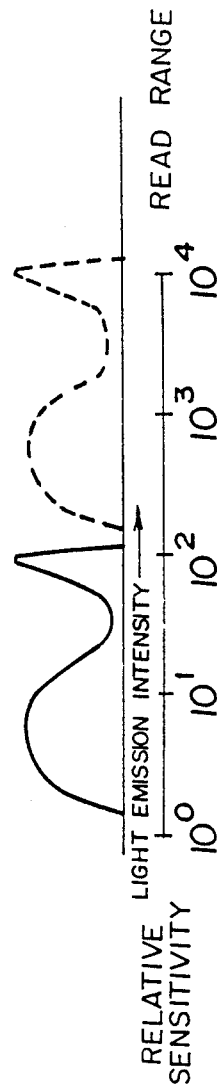
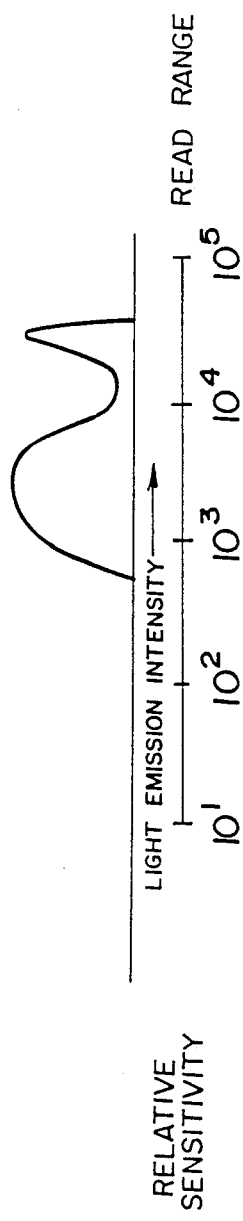

RADIATION IMAGE READ-OUT METHOD AND APPARATUS

BACKGROUND OF THE INVENTION

1. Field of the Invention

This invention relates to a radiation image read-out method for reading out a radiation image stored on a stimulable phosphor sheet by exposing the stimulable phosphor sheet to stimulating rays which cause it to emit light in proportion to the stored radiation energy, and photoelectrically detecting the emitted light, and an apparatus for carrying out the method. This invention particularly relates to a radiation image read-out method wherein the detection level for the light emitted by the stimulable phosphor sheet is automatically adjusted to an optimal level in accordance with image recording conditions.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range of radiation exposure and further in that the electric signals used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having a desirable density regardless of the amount of exposure of the stimulable phosphor sheet to the radiation, by reading out the emitted light with an appropriate read-out gain and converting it into electric signals to reproduce a visible image on a recording medium or a display device. The electric signals may further be subjected to appropriate image processing (signal processing) such as gradation processing or frequency response enhancement processing to obtain a radiation image suitable for viewing, particularly for diagnostic purposes. This is very advantageous in practical use.

In order to obtain a radiation image having a high image quality or a high diagnostic efficiency and accuracy by carrying out image processing such as gradation processing, it is necessary to ascertain such image input conditions of the radiation image stored on the stimulable phosphor sheet as, for example, the level of radiation dose used for image recording, or the image input pattern which is determined by the portion of the object (e.g., the chest or the abdomen of the human body) or the image recording method used, such as plain image recording or contrasted image recording, and then to adjust the image processing conditions to appropriate values based on the ascertained image input conditions or the image input pattern. The image input conditions and the image input pattern will hereinafter be simply referred to as the image input information when they are referred to generically.

Ascertaining of the image input information on the stimulable phosphor sheet may be carried out prior to the visible image reproduction by use of the method disclosed in U.S. Pat. No. 4,527,060. In the disclosed method, a read-out operation for ascertaining the image input information of a radiation image stored on a stimulable phosphor sheet (hereinafter referred to as the preliminary read-out) is carried out in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out). The image processing conditions are adjusted on the basis of the image input information obtained by the preliminary read-out.

However, in order to carry out the preliminary read-out in the manner as mentioned above, a read-out system for the preliminary read-out is necessary besides the read-out system for the final read-out. Or, in the case where a single read-out system is utilized for both the preliminary read-out and the final read-out, a complicated sheet conveyance mechanism is necessary for conveying the stimulable phosphor sheet reversely to the direction of conveyance for sub-scanning with stimulating rays after the preliminary read-out is finished, and then again conveying the stimulable phosphor sheet for the sub-scanning. Also, in the case where the preliminary read-out is carried out in the manner mentioned above, the time taken for read-out processing is prolonged.

Accordingly, the applicant proposed in, for example, Japanese Patent Application No. 61(1986)-174023 a method wherein the preliminary read-out is omitted, the image input information on the stimulable phosphor sheet is ascertained from image signals obtained by the final read-out, and image processing conditions are adjusted to optimal values based on the ascertained image input information.

However, in the case where the preliminary read-out is omitted, it becomes difficult to adjust the read-out conditions for the final read-out to appropriate values. Therefore, there is a risk of the light detection range of a light detection means such as a photomultiplier for the final read-out being adjusted to an incorrect range unsuitable for the image input information on the stimulable phosphor sheet. This problem will hereinbelow be described in detail.

In general, in the case where a radiation image of an object such as the human body is read out, it is sufficient for the read-out range of the light detection means in the final read-out to be two orders of ten in terms of relative sensitivity. However, the intensity range of light emitted by a stimulable phosphor sheet changes markedly in accordance with the radiation image recording conditions, for example, the image recording portion of the object and the image recording method such as normal image recording or enlarged image recording. For example, in mammography or the like, the level of light emitted by the stimulable phosphor sheet becomes markedly higher than in a radiation image of a general object portion. In order to accurately detect all types of radiation images recorded under different image recording conditions, the read-out range must be increased by at least one order of ten to each of the upper and lower sides of the aforesaid read-out range, i.e., a read-out range of at least four orders of ten is necessary in terms of relative sensitivity.

In the preliminary read-out, image read-out is generally carried out coarsely, and the time taken for the image read-out is short. Therefore, a large current can be applied to the light detection means such as the photomultiplier, and frequency response characteristics of a logarithmic amplifier for amplifying the output of a light detection means may not be so high. Accordingly, in the preliminary read-out, the read-out range can be adjusted to at least five orders of ten in terms of relative sensitivity. However, in the final read-out, the time taken for image read-out is long, and therefore it is not always possible to apply a large current to the photomultiplier or the like. As a result, the read-out range on the high light emission region side is limited. On the other hand, it is necessary to keep the frequency response characteristics high in order to obtain image signals of high quality, and the read-out range on the low light emission region side is limited thereby. Consequently, the read-out range for the final read-out is limited to four orders of ten at the most in terms of relative sensitivity.

Therefore, in the case where the read-out range for the final read-out is fixed to four orders of ten in terms of relative sensitivity, the intensity range of the light emitted by the stimulable phosphor sheet goes beyond the read-out range and it becomes impossible to detect all the light emitted by the stimulable phosphor sheet when the aforesaid image recording conditions change and the light emission intensity range deviates markedly toward the low light emission region side or toward the high light emission region side.

SUMMARY OF THE INVENTION

The primary object of the present invention is to provide a radiation image read-out method wherein all light emitted by a stimulable phosphor sheet is detected accurately by adjustment of the read-out range to an optimal range in accordance with the image recording conditions even though preliminary read-out is not carried out.

Another object of the present invention is to provide a radiation image read-out apparatus for carrying out the method.

The present invention provides a radiation image read-out method for exposing a stimulable phosphor sheet carrying a radiation image stored thereon to stimulating rays which cause the stimulable phosphor sheet to emit light in proportion to the stored radiation energy, and photoelectrically detecting the emitted light by use of a light detection means to obtain image signals for use in reproduction of a visible image, wherein the improvement comprises the steps of:

(i) storing light detection ranges of said light detection means suitable for image recording conditions in conformity with the respective image recording conditions in a storage means, and (ii) in the course of detection of said light emitted by said stimulable phosphor sheet, designating the image recording conditions with respect to said stimulable phosphor sheet on which image read-out is to be carried out, reading the light detection range corresponding to the designated image recording conditions from said storage means, and setting said light detection range read from said storage means in said light detection means.

The present invention also provides a radiation image read-out apparatus provided with a means for emitting stimulating rays to a stimulable phosphor sheet carrying a radiation image stored thereon, a means for moving the stimulable phosphor sheet, and a light detection means for photoelectrically detecting light emitted by the stimulable phosphor sheet in proportion to the stored radiation energy upon exposure to stimulating rays and obtaining image signals for use in reproduction of a visible image, wherein the improvement comprises the provision of:

(i) a storage means for storing light detection ranges of said light detection means suitable for image recording conditions in conformity with the respective image recording conditions, (ii) a means for designating the image recording conditions with respect to said stimulable phosphor sheet on which image read-out is to be carried out, and (iii) a light detection range changing means for receiving the designated image recording conditions from said image recording condition designating means, reading the light detection range corresponding to the designated image recording conditions from said storage means, and setting said light detection range read from said storage means in said light detection means.

With the radiation image read-out method and apparatus in accordance with the present invention, even though the preliminary read-out is not carried out, all light emitted by the stimulable phosphor sheet can be detected accurately by adjusting the read-out range of the light detection means to an appropriate range in accordance with the image recording conditions. Therefore, it becomes possible to reproduce a visible radiation image suitable for viewing, particularly for diagnostic purposes.

BRIEF DESCRIPTION OF THE DRAWINGS

FIG. 1 is a schematic view showing an example of the radiation image recording and reproducing system wherein radiation image read-out is carried out by an embodiment of the radiation image read-out method in accordance with the present invention, and FIGS. 2A and 2B are explanatory views showing the read-out ranges for light emitted by the stimulable phosphor sheet.

DESCRIPTION OF THE PREFERRED EMBODIMENTS

The present invention will hereinbelow be described in further detail with reference to the accompanying drawings.

With reference to FIG. 1, a radiation image recording and reproducing system basically comprises a recording section 1, a read-out section 2, and an image recording section 4. A radiation 102 which may be X-rays and which is emitted by a radiation source 100 at the recording section 1 to an object 101 passes through the object 101 and impinges upon a stimulable phosphor sheet 103.

The stimulable phosphor sheet 103 carrying a radiation image of the object 101 stored thereon is sent to the read-out section 2. Examples of the stimulable phosphor used in the stimulable phosphor sheet 103 are described in detail in, for example, U.S. Pat. No. 4,236,078 and European Pat. No. 21,342.

At the read-out section 2, a laser beam 202 produced by a laser beam source 201 is first passed through a filter 203 for cutting off light having a wavelength within the range identical with the range of the wavelength of the light emitted by the stimulable phosphor sheet 103 upon stimulation thereof by the laser beam 202. Then, the beam diameter of the laser beam 202 is strictly adjusted by a beam expander 204. The laser beam 202 is then deflected one-dimensionally by a light deflector 204' formed of a galvanometer mirror or the like, and is made to impinge upon the stimulable phosphor sheet 103 by a plane reflection mirror 205. Between the light deflector 204' and the plane reflection mirror 205 is disposed an $f\theta$ lens 209 for maintaining the beam diameter of the laser beam 202 uniform in the course of the scanning of the laser beam 202 on the stimulable phosphor sheet 103. The laser beam source 201 is selected so that the laser beam 202 emitted thereby as stimulating rays has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e., in the sub-scanning direction) by a sheet conveyance means 210 constituted by conveyor rollers or the like and, consequently, the overall area of the stimulable phosphor sheet 103 is exposed to and scanned by the laser beam 202. Upon exposure to the laser beam 202, the exposed portion of the stimulable phosphor sheet 103 emits light in proportion to the radiation energy stored thereon, and the light emitted enters a light guide member 207 which may be of a shape and a material as disclosed in U.S. Pat. No. 4,346,295. The light emitted by the stimulable phosphor sheet 103 is guided inside of the light guide member 207 through total reflection, projected from the light output face of the light guide member 207 and received by a photomultiplier 208 as a light detection means. The light receiving face of the photomultiplier 208 is closely contacted with a filter for transmitting only the light having the wavelength distribution of the light emitted by the stimulable phosphor sheet 103 and cutting off the light having the wavelength distribution of the stimulating rays, so that the photomultiplier 208 can detect only the light emitted by the stimulable phosphor sheet 103 upon stimulation thereof. The high voltage of the photomultiplier 208 is changeable by a high voltage control circuit 211 acting as the light detection range changing means as will be described later in detail. The light detected by the photomultiplier 208 is converted into electric signals representing the radiation image, and the electric signals are amplified by a logarithmic amplifier 213. The signa produced by the amplifier 213 are converted into digital signals by an A/D converter 220, and stored as read-out image signals Sd in a frame memory 221. The signals are also sent to an image processing control circuit 222. The amplification degree in the amplifier 213 and the scale factor in the A/D converter 220 are fixed to appropriate values.

The image signals Sd stored in the frame memory 221 are read therefrom, and sent to an image processing circuit 223. In the image processing circuit 223, the image signals Sd are processed so as to obtain a visible radiation image suitable for viewing, particularly for diagnostic purposes. The processed image signals Sd are fed to a light modulator 401 at the image reproducing section 4. The image processing condition setting value (c) in the image processing circuit 223 is calculated by the image processing control circuit 222. Specifically, the image processing control circuit 222 receives the read-out image signals Sd in the manner as mentioned above, analyzes a histogram of the image signals Sd by way of example, calculates an appropriate image processing condition setting value (c) corresponding to the image input information on the stimulable phosphor sheet 103 based on the results of the histogram analysis, and sets the calculated value in the image processing circuit 223.

As for the signal processing carried out in the image processing circuit 223, it is possible to employ frequency response processing as disclosed in U.S. Pat. No. 4,315,318, 4,346,295 or 4,387,428, or European Pat No. 31,952, and gradation processing as disclosed in U.S. Pat. No. 4,302,672, 4,276,473 or 4,310,886.

At the image reproducing section 4, a laser beam 403 emitted by a reproducing laser beam source 402 is modulated by the light modulator 401 on the basis of image signals Sd' received from the image processing circuit 223, and is made to impinge upon a photosensitive material 405 such as a photographic film by a scanning mirror 404 for scanning the photosensitive material 405 by the laser beam 403. At this time, the photosensitive material 405 is moved in the direction as indicated by the arrow 406 normal to the aforesaid scanning direction. Accordingly, the radiation image based on the image signals Sd' is recorded on the photosensitive material 405. For reproducing the radiation image, it is also possible to use any other appropriate method. For example, the signals may be electronically displayed on a display device such as a CRT, or the radiation image may be recorded by use of a video tape recorder or a printer. Alternatively, the radiation image may be reproduced on a thermosensitive recording material by use of heat waves.

Changing of the light detection range of the photomultiplier 208 will hereinbelow be described in detail.

With the radiation image recording and reproducing system as shown in FIG. 1, various radiation images such as mammograms and pelvis images are recorded and reproduced. FIGS. 2A and 2B show histograms of the intensity of light emitted by the stimulable phosphor sheet 103. As shown in FIG. 2A, in the case of general radiation images, all light emitted by the stimulable phosphor sheet 103 can be detected accurately when the read-out range in the final read-out is slightly larger than two orders of ten in terms of relative sensitivity.

However, the intensity region of light emission by the stimulable phosphor sheet 103 is different in accordance with the radiation image as indicated by the solid line and the broken line. Therefore, in order to accurately detect all light emitted in every light emission intensity region, a read-out range of at least four orders of ten is necessary in terms of relative sensitivity. Nevertheless, as mentioned above, the read-out range of the photomultiplier 208 can be adjusted only to four orders of ten at the most in terms of relative sensitivity in the case of radiation image read-out for reproduction of a visible image. When the read-out range is fixed to such a level, the emitted light in a markedly low light emission region or in a markedly high light emission region cannot be detected.

In order to eliminate the aforesaid problem, the high voltage control circuit 211 changes the high voltage of the photomultiplier 208 and increases or decreases the readout range of the photomultiplier 208 in accordance with the image recording condition information Ss fed, for example, manually from an image recording condition input means 214. For this purpose, a memory 215 stores read-out ranges suitable for image recording conditions such as normal chest image recording, normal mammography, and stomach contrasted image recording, i.e., the read-out ranges for detecting all of the emitted light whose light emission intensity region changes as mentioned above. The high voltage control circuit 211 reads from the memory 215 the information Sm representing the read-out range corresponding to the image recording conditions Ss received from the image recording condition input means 214, and changes the high voltage of the photomultiplier 208 so that said read-out range is obtained. The memory 215 stores the middle value of each read-out range, and the read-out range is changed by changing the high voltage of the photomultiplier 208 so that the read-out range extends by two orders of ten in terms of relative sensitivity toward each of the higher and lower sides from the middle value. FIGS. 2A and 2B show an example of the changing of the read-out range. The read-out range is adjusted as shown in FIG. 2B in the case where the light emission intensity region of the light emitted by the stimulable phosphor sheet 103 deviates markedly toward the high light emission region side as in the case of image read-out from the stimulable phosphor sheet 103 on which, for example, mammography has been carried out. In the case where the light emission intensity region deviates markedly toward the low light emission region side, the read-out range is adjusted as shown in FIG. 2A. As the read-out range is adjusted in this manner, the light emitted in every light emission intensity region by every type of stimulable phosphor sheet 103 can be detected accurately even though the read-out range of the photomultiplier 208 is of the level of four orders of ten in terms of relative sensitivity.

We claim:

1. A radiation image read-out method for exposing a stimulable phosphor sheet carrying a radiation image stored thereon to stimulating rays which cause the stimulable phosphor sheet to emit light in proportion to the stored radiation energy, and photoelectrically detecting the emitted light by use of a light detection means to obtain image signals for use in reproduction of a visible image, wherein the improvement comprises the steps of:
(i) storing light detection ranges of said light detection means suitable for image recording conditions in conformity with the respective image recording conditions in a storage means, and
(ii) in the course of detection of said light emitted by said stimulable phosphor sheet, designating the image recording conditions with respect to said stimulable phosphor sheet on which image read-out is to be carried out, reading the light detection range corresponding to the designated image recording conditions from said storage means, and setting said light detection range read from said storage means in said light detection means even though preliminary read-out is not carried out.

2. A method as defined in claim 1 wherein said light detection means is a photomultiplier, and the light detection range of said photomultiplier is adjusted by changing a high voltage of said photomultiplier.

3. A radiation image read-out apparatus provided with a means for emitting stimulating rays to a stimulable phosphor sheet carrying a radiation image stored thereon, a means for moving the stimulable phosphor sheet, and a light detection means for photoelectrically detecting light emitted by the stimulable phosphor sheet in proportion to the stored radiation energy upon exposure to stimulating rays and obtaining image signals for use in reproduction of a visible image, wherein the improvement comprises the provision of:
(i) a storage means for storing light detection ranges of said light detection means suitable for image recording conditions in conformity with the respective image recording conditions,
(ii) an input means for designating the image recording conditions with respect to said stimulable phosphor sheet on which image read-out is to be carried out, and
(iii) a light detection range changing means for receiving the designated image recording conditions from said image recording condition designating input means, reading the light detection range corresponding to the designated image recording conditions from said storage means, and setting said light detection range read from said storage means in said light detection means even though preliminary read-out is not carried out.

4. An apparatus as defined in claim 3 wherein said light detection means is a photomultiplier, and said light detection range changing means is a high voltage control circuit for adjusting the light detection range of said photomultiplier by changing a high voltage of said photomultiplier.

* * * * *